United States Patent
Hwang et al.

(10) Patent No.: US 12,078,372 B2
(45) Date of Patent: Sep. 3, 2024

(54) AIR CONDITIONER AND CONTROL METHOD THEREOF

(71) Applicant: SAMSUNG ELECTRONICS CO., LTD., Suwon-si (KR)

(72) Inventors: Jun Hwang, Suwon-si (KR); Sukho Kang, Suwon-si (KR); Chiwook Gu, Suwon-si (KR); Daehui Kim, Suwon-si (KR); Jongwoon Kim, Suwon-si (KR); Taewoo Kim, Suwon-si (KR); Hyugbum Park, Suwon-si (KR); Jungyong Sung, Suwon-si (KR); Kyoungjong Yun, Suwon-si (KR); Hyoshin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 17/734,610

(22) Filed: May 2, 2022

(65) Prior Publication Data
US 2023/0011126 A1    Jan. 12, 2023

Related U.S. Application Data

(63) Continuation of application No. PCT/KR2022/003995, filed on Mar. 22, 2022.

(30) Foreign Application Priority Data

Jul. 9, 2021    (KR) .................. 10-2021-0090485

(51) Int. Cl.
*F24F 11/63*    (2018.01)
*F24F 11/56*    (2018.01)
*F24F 11/76*    (2018.01)

(52) U.S. Cl.
CPC .............. *F24F 11/63* (2018.01); *F24F 11/56* (2018.01); *F24F 11/76* (2018.01)

(58) Field of Classification Search
CPC .. F24F 11/63; F24F 11/56; F24F 11/76; F24F 2120/20; F24F 2110/12; F24F 11/64;
(Continued)

(56) References Cited

U.S. PATENT DOCUMENTS

2019/0271483 A1* 9/2019 Joo .......................... F24F 11/62

FOREIGN PATENT DOCUMENTS

CN    108548269 B  *  9/2020  ............. F24F 11/00
EP    3 604 961 B1    4/2021
(Continued)

OTHER PUBLICATIONS

International Search Report dated Jun. 22, 2022 issued in PCT Application No. PCT/KR2022/003995.

*Primary Examiner* — Kun Kai Ma
(74) *Attorney, Agent, or Firm* — STAAS & HALSEY LLP

(57) ABSTRACT

An air conditioner includes: a fan configured to discharge air cooled by a refrigerant; and at least one processor configured to receive a user input for setting an airflow volume of air to be discharged and a desired temperature, increase a frequency of the compressor to a first critical frequency and maintain the frequency of the compressor as the first critical frequency in response to determining that a temperature difference between an indoor temperature and a desired temperature exceeds the critical temperature difference while controlling the fan to discharge the air with the set airflow volume, determine whether an unsatisfactory condition has occurred, based on at least one cool air-conditioning sensation measurement item while maintaining the first critical frequency, and increase the frequency of the
(Continued)

compressor to a second critical frequency to further decrease a current temperature of the air in response to determining that the unsatisfactory situation has occurred.

20 Claims, 11 Drawing Sheets

(58) Field of Classification Search
CPC .... F24F 11/86; F24F 2110/10; F24F 2110/20; Y02B 30/70
See application file for complete search history.

(56) References Cited

FOREIGN PATENT DOCUMENTS

| | | | | |
|---|---|---|---|---|
| JP | 5-196292 A | 8/1993 | | |
| JP | 6-185787 A | 7/1994 | | |
| JP | 7-35391 | 2/1995 | | |
| JP | 7-35391 A | 2/1995 | | |
| JP | 8-86494 A | 4/1996 | | |
| JP | 3619547 B2 | 2/2005 | | |
| JP | 3732809 B2 * | 1/2006 | ............. | F24F 11/70 |
| JP | 4258117 B2 * | 4/2009 | ............. | F25B 13/00 |
| JP | 4476456 B2 * | 6/2010 | | |
| JP | 2013117373 A * | 6/2013 | ............. | F25B 13/00 |
| JP | 5642145 | 12/2014 | | |
| JP | 6594599 B1 | 10/2019 | | |
| JP | 6642379 | 2/2020 | | |
| JP | 2022-118948 | 8/2022 | | |
| KR | 0160405 B1 | 1/1999 | | |
| KR | 10-2004-0021446 | 3/2004 | | |
| KR | 10-2005-0034086 | 4/2005 | | |
| KR | 10-0857794 B1 | 9/2008 | | |
| KR | 10-2010-0069400 A | 6/2010 | | |
| KR | 10-1927820 B1 | 12/2018 | | |
| KR | 10-2124831 B1 | 7/2020 | | |
| KR | 10-2020-0131108 A | 11/2020 | | |
| KR | 10-2022-0049219 | 4/2022 | | |
| KR | 10-2440118 | 9/2022 | | |
| WO | WO-2012099141 A1 * | 7/2012 | ............ | F24F 1/0007 |
| WO | WO-2012099192 A1 * | 7/2012 | ............ | F24D 15/04 |

* cited by examiner

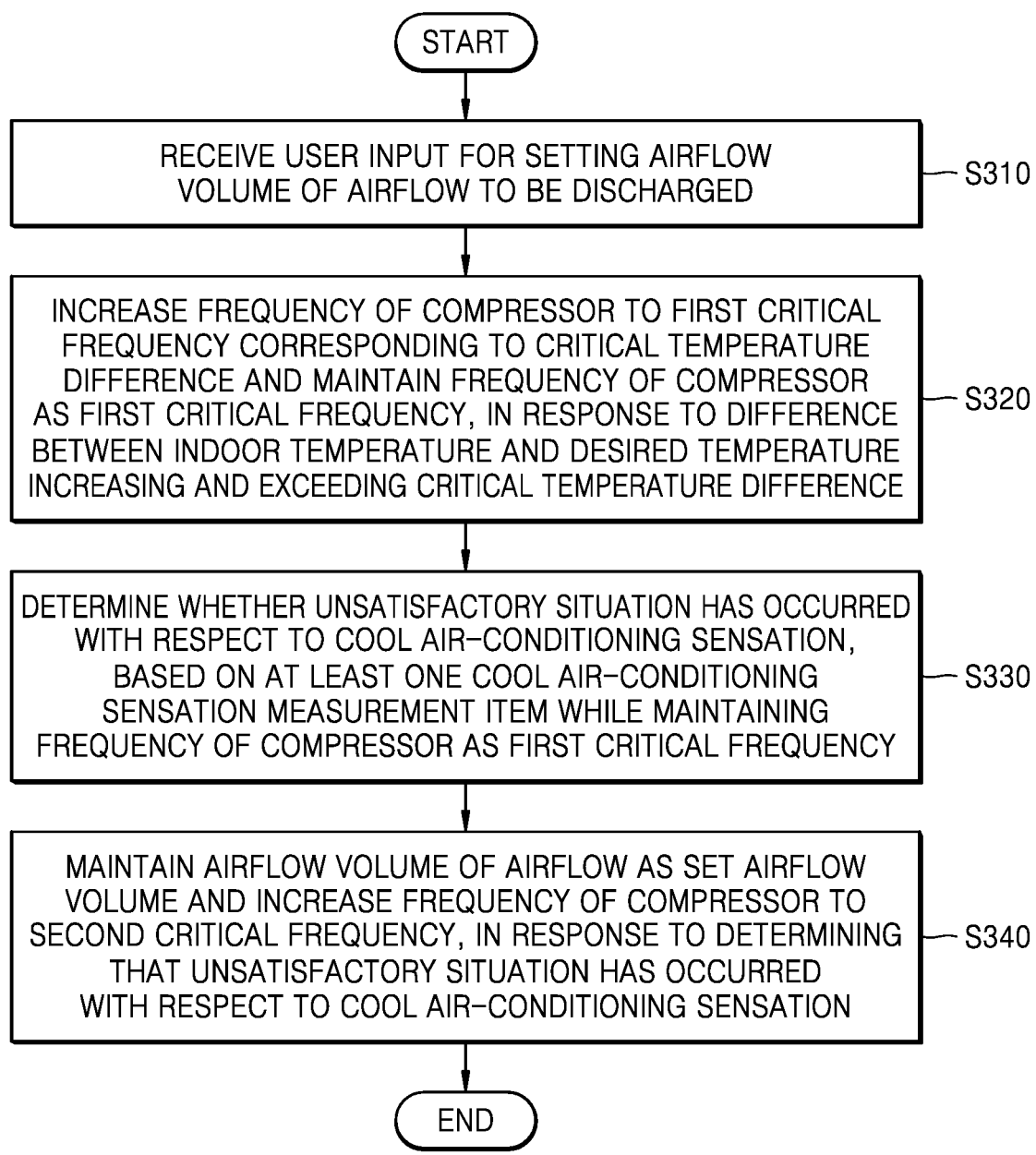

AIR CONDITIONER AND CONTROL METHOD THEREOF

CROSS REFERENCE TO THE RELATED APPLICATION

This application is a continuation application, under 35 U.S.C. § 111(a), of International Application No. PCT/KR2022/003995, filed Mar. 22, 2022, which claims priority to Korean Patent Application No. 10-2021-0090485, filed Jul. 9, 2021, the entire disclosures of all of which are herein incorporated by reference as a part of this application.

1. FIELD

The disclosure relates to an air conditioner and a control method thereof. Particularly, the disclosure relates to an air conditioner for improving a cool air-conditioning sensation of a user.

2. BACKGROUND

When big data according to usage behaviors with respect to air conditioners is analyzed, an air volume most frequently used by air conditioner users is light airflow. The reason why light airflow is preferred is because light airflow causes low noise with a weak air volume compared to a maximum air volume and because users exposed to cold and strong airflow feel unpleasant. However, because a cooling capacity is as weak as the weak air volume, users may be unsatisfied due to not having a cool air-conditioning sensation according to circumstances.

In addition, when an indoor temperature increases again because a user sets an airflow volume as light airflow, it is often necessary to set the airflow volume as strong airflow again to decrease the indoor temperature back down.

Therefore, there is a demand to provide a cool air-conditioning sensation while maintaining an airflow volume selected by a user.

SUMMARY

Embodiments of the disclosure are to provide an air conditioner for improving a cool air-conditioning sensation and a control method thereof.

According to an embodiment of the disclosure, an air conditioner includes: a compressor configured to compress a refrigerant; a fan configured to discharge air cooled by the refrigerant; and at least one processor configured to receive a user input for setting an airflow volume of airflow to be discharged and a desired temperature, determine a temperature difference between an indoor temperature and the received desired temperature, determine whether the temperature difference exceeds a critical temperature difference, increase a frequency of the compressor to a first critical frequency and maintain the frequency of the compressor as the first critical frequency in response to determining that a temperature difference between an indoor temperature and a desired temperature exceeds the critical temperature difference while controlling the fan to discharge air with the set airflow volume, determine whether an unsatisfactory condition has occurred, based on at least one cool air-conditioning sensation measurement item while maintaining the frequency of the compressor as the first critical frequency, and increase the frequency of the compressor to a second critical frequency from the first critical frequency to further decrease a current temperature of the air to be discharged in response to determining that the unsatisfactory condition has occurred.

The first critical frequency may be less than or equal to an effective critical frequency that is a maximum frequency in a frequency period in which an air-conditioning capacity of the compressor is proportional to the frequency of the compressor in the set airflow volume, and the second critical frequency may be greater than the effective critical frequency.

The at least one processor may be further configured to increase the frequency of the compressor to the second critical frequency only when the set airflow volume is set as light airflow.

The at least one cool air-conditioning sensation measurement item may comprise the temperature difference between the indoor temperature and the desired temperature and a set airflow volume duration, and the unsatisfactory condition may be occurred when the temperature difference between the indoor temperature and the desired temperature is greater than or equal to a reference temperature difference and the set airflow volume duration is greater than or equal to a reference time.

The at least one processor may be further configured to provide an alarm for notifying that a temperature of the air is further decreased while maintaining the airflow volume of airflow as the set airflow volume, in response to the occurrence of the unsatisfactory condition.

The at least one processor may be further configured to determine whether indoor humidity is less than or equal to a reference humidity, in response to the occurrence of the unsatisfactory condition, and increase the frequency of the compressor to the second critical frequency only when the indoor humidity is less than or equal to the reference humidity.

The at least one processor may be further configured to decrease the frequency of the compressor back to the frequency that is less than or equal to the first critical frequency when the indoor temperature reaches the desired temperature while maintaining the frequency of the compressor as the second critical frequency.

The at least one processor may be further configured to decrease the frequency of the compressor back to the frequency that is less than or equal to the first critical frequency when a critical time elapses from a time point where the frequency of the compressor was changed to the second critical frequency while maintaining the frequency of the compressor as the second critical frequency.

The at least one processor may be further configured to receive a user input for setting an airflow volume maintenance low temperature mode that is a mode of decreasing only a temperature of the air to be discharged while maintaining the airflow volume of the air, and increase the frequency of the compressor to the second critical frequency while maintaining the airflow volume of the air as the set airflow volume in response to receiving the user input for setting the airflow volume maintenance low temperature mode.

The at least one processor may be further configured to display a time-based indoor temperature expected when operating in the airflow volume maintenance low temperature mode, in response to receiving the user input for setting the airflow volume maintenance low temperature mode.

According to an embodiment of the disclosure, a method of improving a cool air-conditioning sensation includes: receiving a user input for setting an airflow volume of air to be discharged and a desired temperature; determining a temperature difference between an indoor temperature and the received desired temperature; determining whether the temperature difference exceeds a critical temperature difference; increasing a frequency of a compressor to a first critical frequency and maintaining the frequency of the compressor as the first critical frequency in response to the determining that the temperature difference between the indoor temperature and the desired temperature the critical temperature difference while discharging the air with the set airflow volume; determining whether an unsatisfactory condition has occurred, based on at least one cool air-conditioning sensation measurement item while maintaining the frequency of the compressor as the first critical frequency; and increasing the frequency of the compressor to a second critical frequency from the first critical frequency to further decrease a temperature of the air to be discharged in response to the determining that the unsatisfactory condition has occurred.

The first critical frequency may be less than or equal to an effective critical frequency that is a maximum frequency in a frequency period in which an air-conditioning capacity of the compressor is proportional to the frequency of the compressor in the set airflow volume, and the second critical frequency is greater than the effective critical frequency.

The increasing of the frequency of the compressor to the second critical frequency may comprise increasing the frequency of the compressor to the second critical frequency only when the set airflow volume is set as light airflow.

The at least one cool air-conditioning sensation measurement item may comprise the temperature difference between the indoor temperature and the desired temperature and a set airflow volume duration, and the unsatisfactory condition is occurred when the temperature difference between the indoor temperature and the desired temperature is greater than or equal to a reference temperature difference and the set airflow volume duration is greater than or equal to a reference time.

The method may further comprise providing an alarm for notifying that a temperature of airflow is further decreased while maintaining the airflow volume of the air as the set airflow volume, in response to the occurrence of the unsatisfactory condition with respect to the cool air-conditioning sensation.

The increasing of the frequency of the compressor to the second critical frequency may comprise determining whether indoor humidity is less than or equal to a reference humidity, in response to the occurrence of the unsatisfactory condition; and increasing the frequency of the compressor to the second critical frequency only when the indoor humidity is less than or equal to the reference humidity.

The method further comprises decreasing the frequency of the compressor back to the frequency that is less than or equal to the first critical frequency when the indoor temperature reaches the desired temperature while maintaining the frequency of the compressor as the second critical frequency.

The method may further comprise decreasing the frequency of the compressor back to the frequency that is less than or equal to the first critical frequency when a critical time elapses from a time point where the frequency of the compressor was changed to the second critical frequency while maintaining the frequency of the compressor as the second critical frequency.

The method may further comprise receiving a user input for setting a airflow volume maintenance low temperature mode that is a mode of decreasing only a temperature of the air to be discharged while maintaining the airflow volume of the air; and increasing the frequency of the compressor to the second critical frequency while maintaining the airflow volume of the air as the set airflow volume in response to receiving the user input for setting the airflow volume maintenance low temperature mode.

The method may comprise displaying a time-based indoor temperature expected when operating in the airflow volume maintenance low temperature mode, in response to receiving the user input for setting the airflow volume maintenance low temperature mode.

The unsatisfactory condition may include the temperature difference between the indoor temperature and the desired temperature is exceeds the critical temperature difference after maintaining the set airflow volume for a selected amount of time.

BRIEF DESCRIPTION OF DRAWINGS

FIG. 3 is a flowchart of a method, performed by an air conditioner, of improving a cool air-conditioning sensation, according to an embodiment of the disclosure.

DETAILED DESCRIPTION

Figure 1:
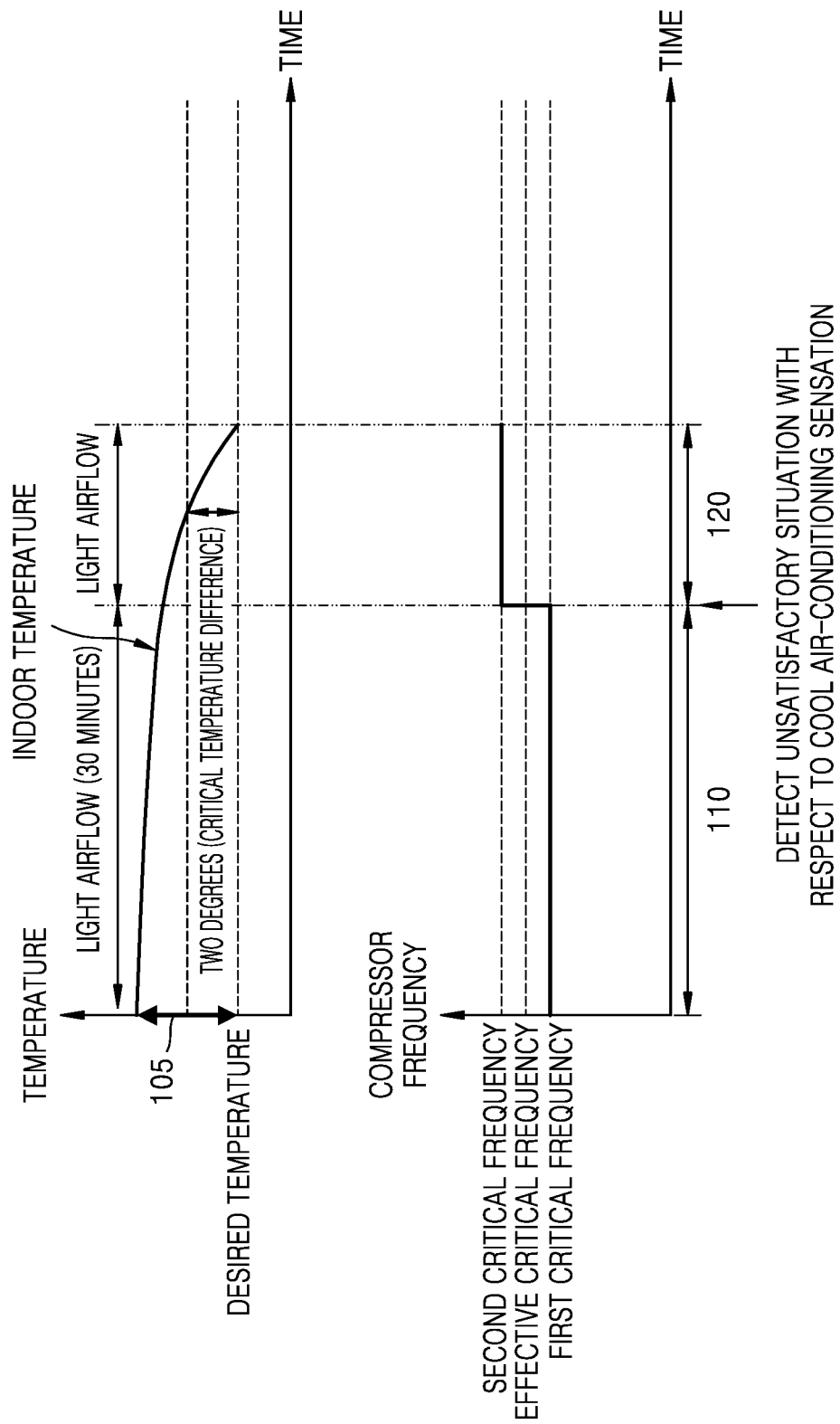
FIG. 1 illustrates a method of improving a cool air-conditioning sensation with respect to an air conditioner, according to an embodiment of the disclosure.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings so that those of ordinary skill in the art to which the disclosure belongs may easily realize the disclosure. However, the disclosure may be embodied in many different forms and should not be construed as being limited to the embodiments of the disclosure set forth herein. In the drawings, parts irrelevant to the description are omitted to clearly describe the disclosure, and like reference numerals denote like elements throughout the specification.

The terms used in the disclosure are those general terms currently widely used in the art while considering the functions of the disclosure, but the terms may vary according to the intention of those of ordinary skill in the art, precedents, or new technology in the art. Thus, the terms used in the disclosure should be defined not as simple names but based on the meaning of the terms and the overall description.

In addition, although terms, such as 'first' and 'second', can be used to describe various elements, the elements cannot be limited by the terms. The terms can be used to classify a certain element from another element.

In addition, the terminology used in the disclosure is used only to describe specific embodiments and does not have any intention to limit the disclosure. An expression in the singular includes an expression in the plural unless they are clearly different from each other in context. In addition, throughout the specification, when it is described that a certain part is "connected" to another part, it should be understood that the certain part is "directly connected" to another part or "electrically connected" to another part via another element in the middle. In addition, when a certain part "includes" a certain component, this indicates that the part may further include another component instead of excluding another component unless there is different disclosure.

The use of the term "the" or a similar directional term in the specification (in particular, in claims) may correspond to both the singular and the plural. In addition, when an order is not clearly disclosed for steps describing a method, the disclosed steps can be performed in any order deemed proper. The disclosure is not limited to the disclosed order of the steps.

The wording "in some embodiments" or "in an embodiment" appearing at various places of the specification does not necessarily indicate the same embodiment(s).

Some embodiments of the disclosure can be represented with functional blocks and various processing steps. Some or all of these functional blocks can be implemented by various numbers of hardware and/or software configurations for executing specific functions. For example, the functional blocks of the disclosure can be implemented by one or more microprocessors or by circuit configurations for a certain function. In addition, for example, the functional blocks of the disclosure can be implemented by various programming or scripting languages. The functional blocks can be implemented with algorithms executed in one or more processors. In addition, the disclosure may adopt the prior art for electronic environment setup, signal processing, and/or data processing. The terms, such as "mechanism", "element", "means", and "configuration", can be widely used and are not delimited as mechanical and physical configurations.

In addition, connections lines or connection members between components shown in the drawings illustrate functional connections and/or physical or circuit connections. The connections between components can be represented by replaceable or additional various functional connections, physical connections, or circuit connections in an actual apparatus.

FIG. 1 illustrates a method of improving a cool air-conditioning sensation with respect to an air conditioner, according to an embodiment of the disclosure.

Referring to FIG. 1, an air conditioner 1000 (see FIG. 2) may improve a cool air-conditioning sensation without changing an airflow volume set by a user.

As a frequency of a compressor increases, the air conditioner 1000 may discharge colder airflow, and as shown in FIG. 1, a difference 105 between an indoor temperature and a desired temperature is greater than a critical temperature difference, the air conditioner 1000 may drive the compressor by increasing the frequency of the compressor to a first critical frequency. The first critical frequency may be a critical frequency preset in the air conditioner 1000 for the air conditioner 1000 to operate in a frequency period in which the reliability of the compressor is guaranteed.

When the frequency of the compressor increases to an effective critical frequency in the air conditioner 1000, an air-conditioning capacity of the compressor increases in proportion to the frequency of the compressor. However, as the frequency of the compressor increases by exceeding the effective critical frequency, the capacity of the compressor may cause phenomena such as dew formation and heat exchanger freeze instead of increasing the air-conditioning capacity, thereby not guaranteeing the reliability of the compressor. The effective critical frequency may be determined through experiments or calculated based on the performance of the compressor and an internal structure of the air conditioner 1000. In addition, as the airflow volume increases more, air cooled by the compressor may be more discharged without staying in the air conditioner 1000, and thus, as the airflow volume increases more, the effective critical frequency is determined as a higher value in response to the airflow volume.

As shown in FIG. 1, by setting the first critical frequency to be lower than the effective critical frequency, the air conditioner 1000 may operate in the frequency period in which the reliability of the compressor is guaranteed.

However, even though the air conditioner 1000 continuously driving the compressor at the first critical frequency, the indoor temperature does not quickly decrease when the set airflow volume is light airflow, as shown in a first time period 110 of FIG. 1. Particularly, when the set airflow volume is light airflow, a velocity of discharged airflow is slow, and thus, cold airflow may not be quickly spread to an entire room. In addition, as described above, as the airflow volume decreases, the first critical frequency corresponding to the airflow volume also decreases. Therefore, the first critical frequency when the airflow volume is light airflow has a lower value than the first critical frequency when the airflow volume is middle airflow or strong airflow. Therefore, even though the compressor operates at the first critical frequency, less cold airflow is discharged when the airflow volume is light airflow than when the airflow volume is middle airflow or strong airflow, and thus, the indoor temperature does not quickly decrease.

Therefore, when the set airflow volume is light airflow, when the difference between the indoor temperature and the desired temperature exceeds the critical temperature difference, because the air conditioner 1000 may maintain the frequency of the compressor as the first critical frequency, the indoor temperature may not quickly decrease even though the air conditioner 1000 operates. Accordingly, after a certain time elapses, the user may be unsatisfied with a cool air-conditioning sensation.

The air conditioner 1000 may determine whether an unsatisfactory situation has occurred with respect to a cool air-conditioning sensation, based on a cool air-conditioning sensation measurement item. The unsatisfactory situation with respect to the cool air-conditioning sensation may be a situation in which the user is unsatisfied with the cool air-conditioning sensation. The cool air-conditioning sensation measurement item that is a reference to determine whether the unsatisfactory situation has occurred with respect to the cool air-conditioning sensation may include an indoor temperature and desired temperature difference item and a set airflow volume duration item but is not limited thereto.

Referring to FIG. 1, in a state in which the difference between the indoor temperature and the desired temperature is continuously maintained to be 3 degrees or more in the first time period 110, when a light airflow duration of 30 minutes elapses, the air conditioner 1000 may determine that the unsatisfactory situation has occurred with respect to the cool air-conditioning sensation.

Referring to a second time period 120 of FIG. 1, in response to detection of the unsatisfactory situation with respect to the cool air-conditioning sensation, the air conditioner 1000 may temporarily increase the frequency of the compressor from the first critical frequency to a second critical frequency to discharge colder airflow.

The second critical frequency is a frequency applied to the compressor when the unsatisfactory situation occurs with respect to the cool air-conditioning sensation and may be pre-stored in the air conditioner 1000.

The second critical frequency according to an embodiment of the disclosure may be set to be greater than the effective critical frequency. For example, the second critical frequency may be greater by 10% than the effective critical frequency. As another example, the second critical frequency may be selected within a frequency period in which a gain of an air-conditioning capacity is greater than a little bit loss of a compressor efficiency decrease. The second critical frequency may also be determined through experiments.

In addition, the second critical frequency according to another embodiment of the disclosure may be set to be greater than the first critical frequency and less than the effective critical frequency.

When the frequency of the compressor is set as the second critical frequency, the air conditioner 1000 may discharge colder airflow, and the colder airflow may cause the indoor temperature to quickly decrease, and thus, the air conditioner 1000 may improve the cool air-conditioning sensation while maintaining light airflow set by the user.

Figure 2:
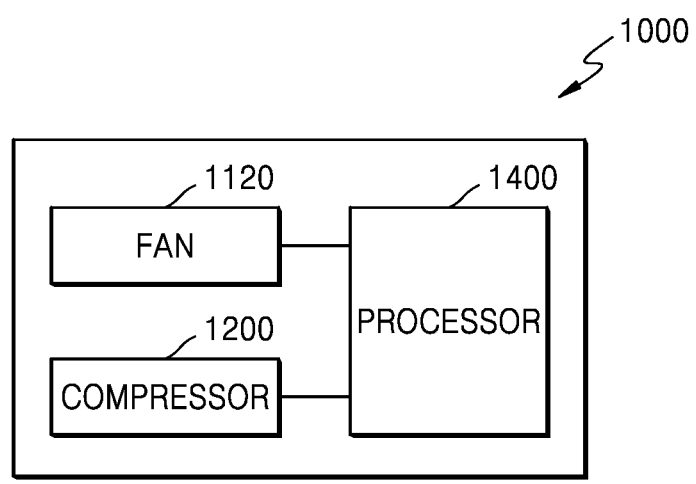
FIG. 2 is a block diagram of an air conditioner for improving a cool air-conditioning sensation, according to an embodiment of the disclosure.

FIG. 2 is a block diagram of the air conditioner 1000 for improving a cool air-conditioning sensation, according to an embodiment of the disclosure.

Referring to FIG. 2, the air conditioner 1000 may include a processor 1400, a compressor 1200, and a fan 1120.

The compressor 1200 cools ambient air down. The compressor 1200 may compress a refrigerant. The refrigerant compressed with a high temperature and high pressure by the compressor 1200 may cool down the air around a heat exchanger located in an indoor unit by absorbing heat through the heat exchanger while circulating by a cooling cycle of the air conditioner 1000. The cooled air is discharged as airflow by the fan 1120. In this case, as a frequency of the compressor 1200 increases more, the air around the heat exchanger is more cooled, and accordingly, a temperature of airflow to be discharged also decreases more.

The fan 1120 may discharge the cooled air around the heat exchanger through a discharge port (an air discharge portion). Along with rotation of the fan 1120, the cooled air is discharged in the form of airflow, and as revolutions per minute of the fan 1120 increase, an airflow volume or velocity of the airflow also increases.

In the air conditioner 1000, a degree of compression of the refrigerant increases as the frequency of the compressor 1200 increases, and heat absorbed through the heat exchanger increases as the degree of compression of the refrigerant increases, thereby increasing an air-conditioning capacity of the air conditioner 1000. In this case, when air cooled by the heat exchanger is not sufficiently discharged through the discharge port because the revolutions per minute of the fan 1120 are not sufficient, heat exchanging inside the indoor unit does not sufficiently occur.

The air-conditioning capacity may increase in proportion to a frequency increase value up to an effective critical frequency, but when the frequency of the compressor 1200 exceeds the effective critical frequency, heat exchanging inside the indoor unit does not sufficiently occur, thereby decreasing the reliability of the compressor 1200. That is, when the frequency of the compressor 1200 exceeds the effective critical frequency, a capacity of the compressor 1200 causes phenomena such as dew formation inside the indoor unit and heat exchanger freeze instead of increasing the air-conditioning capacity, thereby only consuming unnecessary power.

In general, the effective critical frequency of the compressor 1200 is proportional to an airflow volume or the revolutions per minute of the fan 1120 and may be experimentally determined by considering the revolutions per minute of the fan 1120.

The processor 1400 controls a general operation of the air conditioner 1000.

The processor 1400 according to an embodiment of the disclosure may receive a user input for setting an airflow volume of airflow to be discharged. For example, the processor 1400 may receive a user input for setting, as light airflow, the airflow volume of airflow to be discharged.

The air conditioner 1000 may further include a user input interface (not shown) configured to set the airflow volume, and the processor 1400 may receive, through the user input interface, a user input for setting light airflow. The user input interface may include a button or a touch pad attached to the air conditioner 1000 or a remote control but is not limited thereto.

In addition, the air conditioner 1000 may further include a communication module (not shown), and the processor 1400 may receive, from an external device through the communication module (not shown), a user input for setting the airflow volume. The external device may include a cellular phone, a personal computer (PC), or the like but is not limited thereto.

In response to receiving a user input for setting the airflow volume of airflow to be discharged, the processor 1400 may control the fan 1120 to discharge airflow with the set airflow volume.

While discharging airflow with the set airflow volume, the processor 1400 may determine whether a difference between an indoor temperature and a desired temperature exceeds a critical temperature difference.

While the difference between the indoor temperature and the desired temperature is increasing to the critical temperature difference, the processor 1400 may increase the frequency of the compressor 1200 to a first critical frequency corresponding to the critical temperature difference to discharge gradually colder airflow.

While the difference between the indoor temperature and the desired temperature is continuously increasing by exceeding the critical temperature difference, the processor 1400 may maintain the frequency of the compressor 1200 as the first critical frequency without further increasing the frequency of the compressor 1200.

The first critical frequency is a frequency equal to or less than the effective critical frequency that is a maximum frequency in a frequency period in which the reliability of the compressor 1200 is guaranteed in the set airflow volume, and may be pre-stored in the air conditioner 1000. While the compressor 1200 is operating at the first critical frequency or less, the air-conditioning capacity of the compressor 1200 increases in proportion to the frequency of the compressor 1200, and phenomena such as dew formation inside the indoor unit, heat exchanger freeze, and unnecessary power consumption may not occur.

While the frequency of the compressor 1200 is being maintained as the first critical frequency, the processor 1400 may determine whether an unsatisfactory situation has occurred with respect to a cool air-conditioning sensation, based on at least one cool air-conditioning sensation measurement item. The air conditioner 1000 may determine that the unsatisfactory situation has occurred with respect to the cool air-conditioning sensation, when the at least one cool air-conditioning sensation measurement item satisfies a cool air-conditioning sensation unsatisfaction condition.

The at least one cool air-conditioning sensation measurement item includes at least one item associated with a cool air-conditioning sensation. The at least one cool air-conditioning sensation measurement item may be defined based on criteria for temperature, airflow volume, and the like. The at least one cool air-conditioning sensation measurement item may include, for example, an indoor temperature and desired temperature difference item and a set airflow volume duration item but is not limited thereto. In addition, the unsatisfactory situation with respect to the cool air-conditioning sensation may include, for example, a situation in which the difference between the indoor temperature and the desired temperature is a reference temperature difference or more and a set airflow volume duration is a reference time or more but is not limited thereto.

As it is determined that the unsatisfactory situation has occurred with respect to the cool air-conditioning sensation, the processor 1400 may maintain the airflow volume of airflow as the set airflow volume and temporarily increase the frequency of the compressor 1200 to a second critical frequency, thereby further decreasing a temperature of airflow to be discharged. The second critical frequency may be greater than the effective critical frequency.

When a difference between the second critical frequency and the effective critical frequency is not large, even though the compressor 1200 operates at a frequency greater than the effective critical frequency, the efficiency of the compressor 1200 may only temporarily decrease a little, but the air conditioner 1000 may exhibit a high air-conditioning capacity.

Accordingly, the air conditioner 1000 may improve a cool air-conditioning sensation by discharging colder airflow while maintaining an airflow volume desired by the user.

The processor 1400 according to an embodiment of the disclosure may determine whether the set airflow volume is light airflow and increase the frequency of the compressor 1200 to the second critical frequency only when the set airflow volume is light airflow.

According to an embodiment of the disclosure, light airflow may indicate a minimum airflow volume settable in the air conditioner 1000 by the user. In addition, according to another embodiment of the disclosure, light airflow may indicate a preset airflow volume or less. For example, in the air conditioner 1000 in which an airflow volume increases in an order of no airflow, breeze, light airflow, middle airflow, and strong airflow, when the preset airflow volume is light airflow, the air conditioner 1000 may increase the frequency of the compressor 1200 to the second critical frequency only when one of no airflow, breeze, and light airflow is selected.

In addition, in response to the occurrence of the unsatisfactory situation with respect to the cool air-conditioning sensation, the processor 1400 according to an embodiment of the disclosure may provide an alarm for notifying that a temperature of airflow is further decreased while maintaining the airflow volume of airflow as the set airflow volume. For example, the air conditioner 1000 may include a speaker or a display, and the processor 1400 may output an alarm through the speaker or display, through the display, an icon or a phrase indicating an alarm. The air conditioner 1000 may transmit, to the external device through the communication module, information indicating an alarm.

Alternatively, the processor 1400 according to an embodiment of the disclosure may increase the frequency of the compressor 1200 to the second critical frequency only when indoor humidity is reference humidity or less. The reference humidity may be, for example, 55%. By increasing the frequency of the compressor 1200 to the second critical frequency only when the indoor humidity is the reference humidity or less, the processor 1400 may prevent dew from being formed in the inside or the outside of the indoor unit.

In addition, the processor 1400 according to an embodiment of the disclosure may decrease the frequency of the compressor 1200 back to the first critical frequency or less when the indoor temperature reaches the desired temperature while maintaining the frequency of the compressor 1200 as the second critical frequency. As another example, the processor 1400 may decrease the frequency of the compressor 1200 back to the first critical frequency or less when the difference between the indoor temperature and the desired temperature decreases to the reference temperature difference or less. In addition, as another example, the processor 1400 may decrease the frequency of the compressor 1200 back to the first critical frequency or less when the difference between the indoor temperature and the desired temperature decreases to the critical temperature difference or less.

Alternatively, the processor 1400 according to an embodiment of the disclosure may decrease the frequency of the compressor 1200 back to the first critical frequency or less when a critical time elapses from a time point where the frequency of the compressor 1200 was changed to the second critical frequency while maintaining the frequency of the compressor 1200 as the second critical frequency. By decreasing the frequency of the compressor 1200 back to the first critical frequency or less after the critical time, phenomena occurring when the compressor 1200 operates at a frequency exceeding the effective critical frequency may be prevented.

In addition, the processor 1400 according to an embodiment of the disclosure may receive, through the user input interface, a user input for setting an airflow volume maintenance low temperature mode that is a mode of decreasing only a temperature of airflow to be discharged while maintaining an airflow volume of airflow.

In response to receiving the user input for setting the airflow volume maintenance low temperature mode, the processor 1400 may discharge colder airflow by maintaining the airflow volume of airflow as the set airflow volume and increasing the frequency of the compressor 1200 to the second critical frequency, regardless of whether the unsatisfactory situation has occurred with respect to the cool air-conditioning sensation.

In addition, in response to receiving the user input for setting the airflow volume maintenance low temperature mode, the processor 1400 may display a time-based indoor temperature expected when operating in the airflow volume maintenance low temperature mode.

FIG. 3 is a flowchart of a method, performed by an air conditioner, of improving a cool air-conditioning sensation, according to an embodiment of the disclosure.

In operation S310, the air conditioner 1000 may receive a user input for setting an airflow volume of airflow to be discharged.

For example, the air conditioner 1000 may receive a user input for setting the airflow volume of airflow to be discharged as light airflow. According to an embodiment of the disclosure, the air conditioner 1000 may receive a user input for setting, as middle airflow, the airflow volume of airflow to be discharged. Alternatively, the air conditioner 1000 may receive a user input for setting, as a first step or a second step, the airflow volume of airflow to be discharged.

In operation S320, the air conditioner 1000 may increase the frequency of the compressor 1200 to a first critical frequency corresponding to a critical temperature difference and maintain the frequency of the compressor 1200 as the first critical frequency, in response to a difference between an indoor temperature and a desired temperature increasing and exceeding the critical temperature difference.

In operation S330, the air conditioner 1000 may determine whether an unsatisfactory situation has occurred with respect to a cool air-conditioning sensation, based on at least one cool air-conditioning sensation measurement item while maintaining the frequency of the compressor 1200 as the first critical frequency.

In operation S340, the air conditioner 1000 may maintain the airflow volume of airflow as the set airflow volume and increase the frequency of the compressor 1200 to a second critical frequency, as it is determined that the unsatisfactory situation has occurred with respect to the cool air-conditioning sensation.

Alternatively, the air conditioner 1000 according to an embodiment of the disclosure may increase the frequency of the compressor 1200 to the second critical frequency only when the set airflow volume is light airflow. In a case where the set airflow volume is not light airflow, the air conditioner 1000 may maintain the frequency of the compressor 1200 as the first critical frequency even when the unsatisfactory situation has occurred with respect to the cool air-conditioning sensation.

In addition, the air conditioner 1000 according to an embodiment of the disclosure may provide an alarm for notifying that a temperature of airflow is further decreased while maintaining the airflow volume of airflow as the set airflow volume, in response to the occurrence of the unsatisfactory situation with respect to the cool air-conditioning sensation.

Alternatively, the air conditioner 1000 according to an embodiment of the disclosure may determine whether indoor humidity is reference humidity or less in response to the occurrence of the unsatisfactory situation with respect to the cool air-conditioning sensation and increase the frequency of the compressor 1200 to the second critical frequency only when the indoor humidity is the reference humidity or less.

In addition, the air conditioner 1000 according to an embodiment of the disclosure may decrease the frequency of the compressor 1200 back to the first critical frequency or less when the indoor temperature reaches the desired temperature while maintaining the frequency of the compressor 1200 as the second critical frequency.

Alternatively, the air conditioner 1000 according to an embodiment of the disclosure may decrease the frequency of the compressor 1200 back to the first critical frequency or less when a critical time elapses from a time point where the frequency of the compressor 1200 was changed to the second critical frequency while maintaining the frequency of the compressor 1200 as the second critical frequency.

In addition, the air conditioner 1000 according to an embodiment of the disclosure may receive a user input for setting the airflow volume maintenance low temperature mode that is a mode of decreasing only a temperature of airflow to be discharged while maintaining a airflow volume, regardless of whether the unsatisfactory situation has occurred with respect to the cool air-conditioning sensation while maintaining the frequency of the compressor 1200 as the first critical frequency.

In response to receiving the user input for setting the airflow volume maintenance low temperature mode, the air conditioner 1000 may maintain the airflow volume as the set airflow volume and increase the frequency of the compressor 1200 to the second critical frequency.

In addition, in response to receiving the user input for setting the airflow volume maintenance low temperature mode, the air conditioner 1000 may display a time-based indoor temperature expected when operating in the airflow volume maintenance low temperature mode.

Figure 4A:
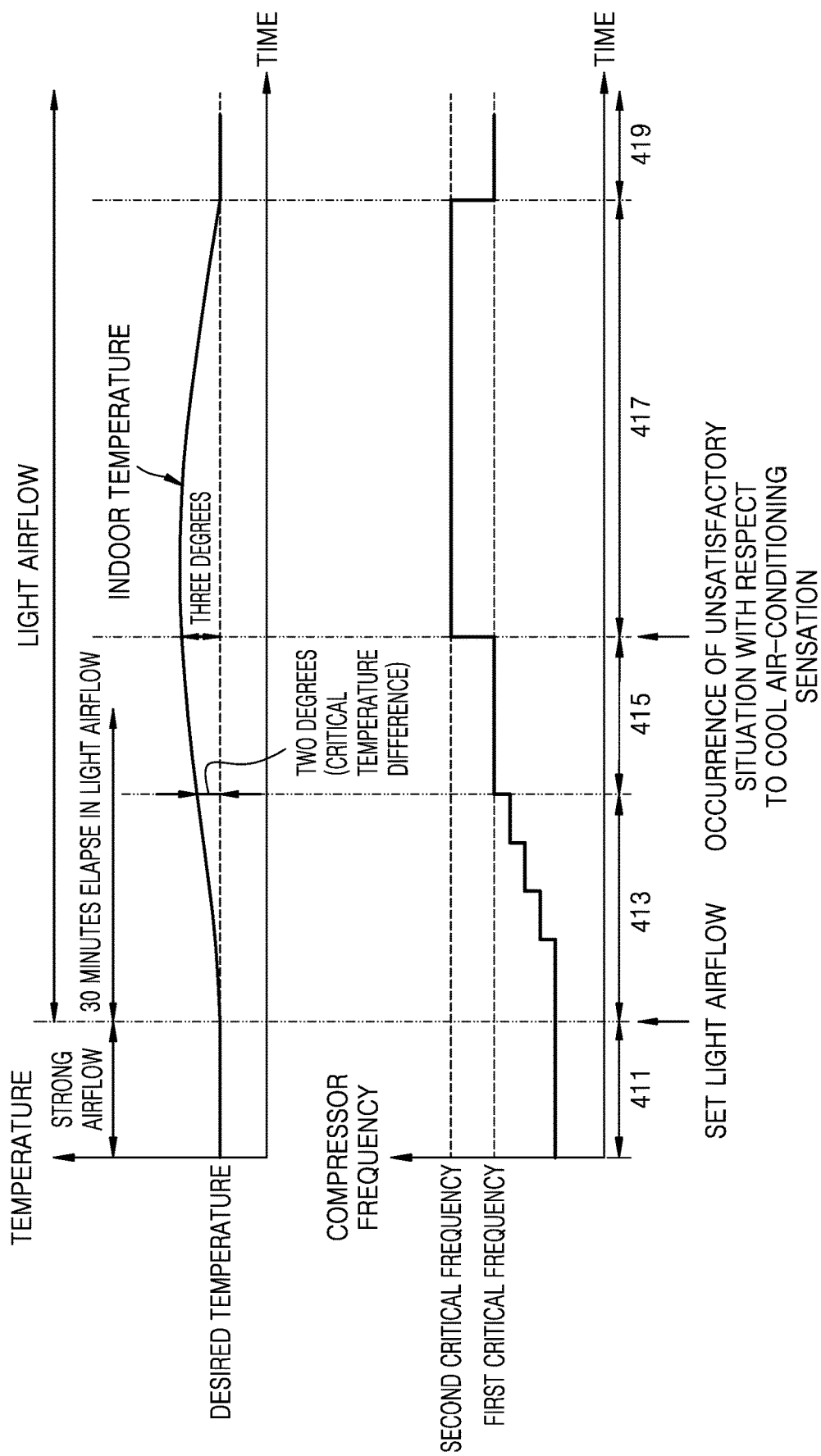
FIGS. 4A and 4B illustrate a method, performed by an air conditioner, of improving a cool air-conditioning sensation when an airflow volume is set as light airflow, according to an embodiment of the disclosure.
Figure 4B:
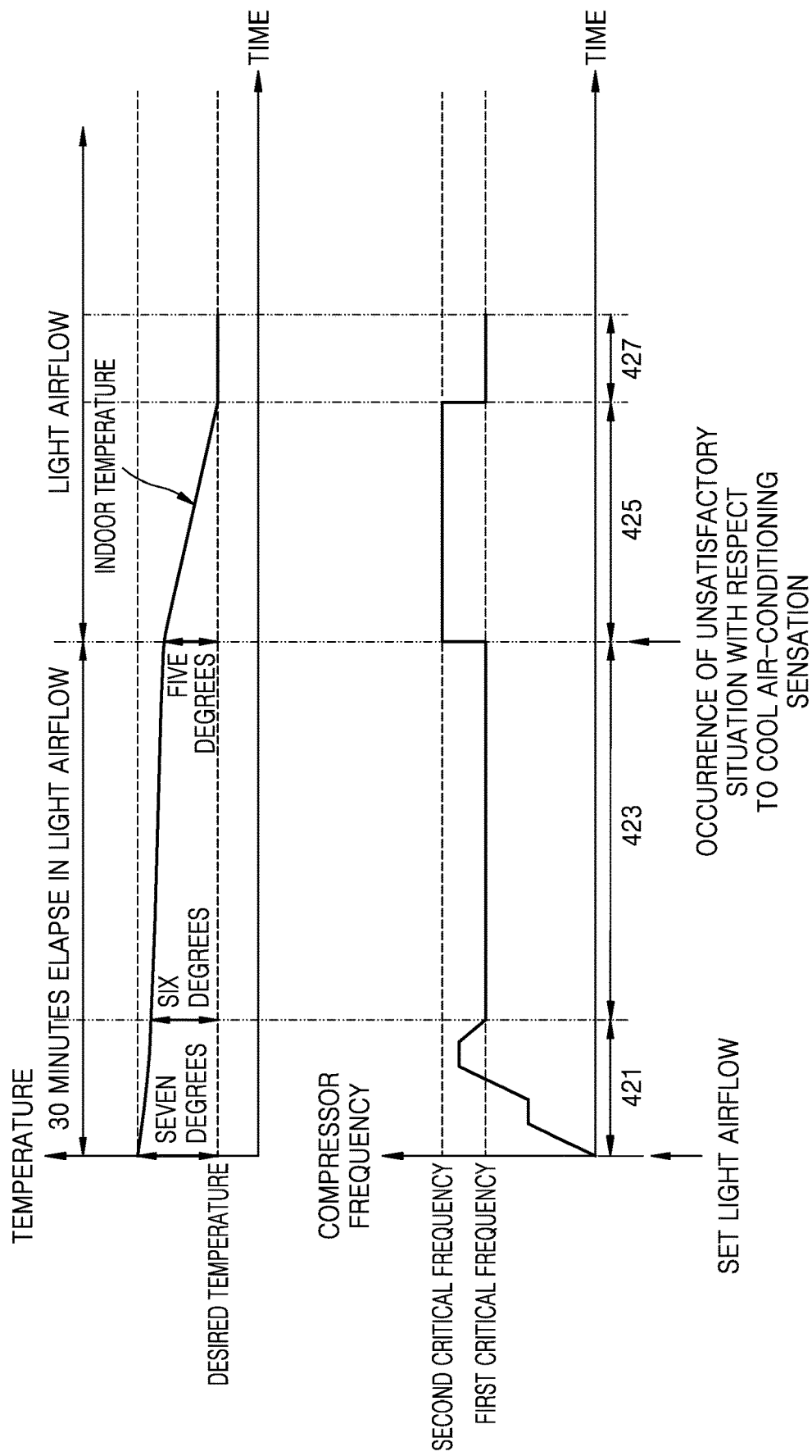

FIGS. 4A and 4B illustrate a method, performed by an air conditioner, of improving a cool air-conditioning sensation when an airflow volume is set as light airflow, according to an embodiment of the disclosure.

FIG. 4A shows an example in which the air conditioner 1000 improves a cool air-conditioning sensation when the user sets an airflow volume as light airflow after an indoor temperature reaches a desired temperature.

Referring to a first time period 411, after the indoor temperature reaches the desired temperature by strong airflow, the air conditioner 1000 may receive a user input for setting the airflow volume as light airflow.

Referring to a second time period 413, in response to receiving the user input for setting the airflow volume as light airflow, the air conditioner 1000 may control the fan 1120 to discharge light airflow. While keeping light airflow, when heat from an indoor heat source or heat introduced from the outside exceeds an air-conditioning capacity transferred by light airflow, the indoor temperature may gradually increase over the desired temperature.

In response to the increase in the indoor temperature, the air conditioner 1000 may increase the frequency of the compressor 1200 based on a difference between the indoor temperature and the desired temperature. When the difference between the indoor temperature and the desired temperature increases, the air-conditioning capacity should also increase, and thus, the air conditioner 1000 increases the frequency of the compressor 1200 to discharge colder airflow.

In this case, as shown in FIG. 4A, the air conditioner 1000 may increase the frequency of the compressor 1200 in a staircase shape in response to the increase in the difference between the indoor temperature and the desired temperature. As another example, the air conditioner 1000 may linearly increase the frequency of the compressor 1200 in proportion to the difference between the indoor temperature and the desired temperature.

Referring to a third time period 415, when the difference between the indoor temperature and the desired temperature increases to two degrees that are a critical temperature difference, the air conditioner 1000 may increase the frequency of the compressor 1200 to a first critical frequency.

The first critical frequency may be less than an effective critical frequency that is a maximum frequency in a frequency period in which the air-conditioning capacity of the compressor 1200 corresponds to the frequency of the compressor 1200. Accordingly, while the compressor 1200 is operating at the first critical frequency or less, the air-conditioning capacity of the compressor 1200 increases in proportion to the frequency of the compressor 1200, and phenomena such as dew formation inside the indoor unit, heat exchanger freeze, and unnecessary power consumption may not occur. The first critical frequency may be set in advance to a value less than the effective critical frequency (e.g., when the effective critical frequency is 50 Hz, the first critical frequency is 40 Hz) and stored in the air conditioner 1000.

As shown in FIG. 4A, even though the difference between the indoor temperature and the desired temperature increases more by exceeding two degrees that are the critical temperature difference, the air conditioner 1000 maintains the first critical frequency without increasing the frequency of the compressor 1200.

The air conditioner 1000 may determine whether an unsatisfactory situation has occurred with respect to a cool air-conditioning sensation, based on at least one cool air-conditioning sensation measurement item while maintaining the frequency of the compressor 1200 as the first critical frequency. Cool air-conditioning sensation measurement items shown in FIG. 4A include an indoor temperature and desired temperature difference item and a set airflow volume operating duration item, and unsatisfaction conditions with respect to a cool air-conditioning sensation, corresponding to the cool air-conditioning sensation measurement items, may include a condition in which the difference between the indoor temperature and the desired temperature is three degrees or more and a condition in which a set airflow volume operating duration is more than 30 minutes.

The air conditioner 1000 may determine that the unsatisfactory situation has occurred with respect to the cool air-conditioning sensation, when the cool air-conditioning sensation measurement items respectively satisfy the unsatisfaction conditions with respect to a cool air-conditioning sensation. As shown in FIG. 4A, when 30 minutes has elapsed after the airflow volume was set, and the difference between the indoor temperature and the desired temperature is three degrees or more, the air conditioner 1000 may determine that the unsatisfactory situation has occurred with respect to the cool air-conditioning sensation.

Referring to a fourth time period 417, in response to determining that the unsatisfactory situation has occurred with respect to the cool air-conditioning sensation, the air conditioner 1000 may increase the frequency of the compressor 1200 to a second critical frequency while maintaining the airflow volume of airflow as the set airflow volume.

The second critical frequency may be greater than the effective critical frequency. Alternatively, according to an embodiment of the disclosure, the second critical frequency may be greater than the first critical frequency but less than or equal to the effective critical frequency.

While the air conditioner 1000 is operating at the second critical frequency that is greater than the effective critical frequency, the efficiency of the compressor 1200 may decrease, and dew formation or heat exchanger freeze may occur. However, when a difference between the second critical frequency and the effective critical frequency is not large (e.g., the difference between the second critical frequency and the effective critical frequency is within 10% of the effective critical frequency), the efficiency of the compressor 1200 is almost the same as or decreases not much than that when the compressor 1200 operates at the effective critical frequency. In addition, when the difference between the second critical frequency and the effective critical frequency is not large, dew formation or heat exchanger freeze does not occur only with an operation for a short time (e.g., one to two hours). Therefore, when the difference between the second critical frequency and the effective critical frequency is not large, even though the compressor 1200 operates at a frequency greater than the effective critical frequency, for one or two hours, the air conditioner 1000 may exhibit a high air-conditioning capacity while the efficiency of the compressor 1200 merely decreases a little bit.

When the compressor 1200 operates at the second critical frequency, the air conditioner 1000 may discharge colder airflow while maintaining the airflow volume set by the user, and thus, as shown in FIG. 4A, the indoor temperature may decrease back to the desired temperature.

Referring to a fifth period 419, when the indoor temperature reaches the desire temperature again, the air conditioner 1000 may decrease the frequency of the compressor 1200 from the second critical frequency to the first critical frequency. According to an embodiment of the disclosure, the air conditioner 1000 may decrease the frequency of the compressor 1200 from the second critical frequency to the first critical frequency when the difference between the indoor temperature and the desired temperature decreases by two degrees that are the critical temperature difference instead of when the indoor temperature reaches the desire temperature.

FIG. 4B shows a process, performed by the air conditioner 1000, of improving a cool air-conditioning sensation of the user when the user sets an airflow volume of airflow as light airflow immediately after turning the air conditioner 1000 on.

Referring to a first time period 421, the air conditioner 1000 may receive a user input for setting the airflow volume of airflow as light airflow after power thereof is turned on. In addition, the air conditioner 1000 may determine the frequency of the compressor 1200 to correspond to a difference between an indoor temperature and a desired temperature.

As shown in FIG. 4B, the difference (seven degrees) between the indoor temperature and the desired temperature is greater than a critical temperature difference (two degrees), the air conditioner 1000 may increase the frequency of the compressor 1200 from 0 Hz to a first critical frequency and then maintain the frequency of the compressor 1200 as the first critical frequency. In this case, for safety of the compressor 1200, the frequency of the compressor 1200 may increase so that a period in which the frequency linearly increases and a period in which the frequency is constantly maintained repeat as in a shape of the first time period 421 of FIG. 4B.

Referring to a second time period 423, even when the compressor 1200 operates at the first critical frequency, in a case where the difference between the indoor temperature and the desired temperature is large and the airflow volume is weak, the indoor temperature may not quickly decrease.

While maintaining the frequency of the compressor 1200 as the first critical frequency, the air conditioner 1000 may determine whether an unsatisfactory situation has occurred with respect to a cool air-conditioning sensation, based on at least one cool air-conditioning sensation measurement item. As shown in FIG. 4B, while maintaining the difference between the indoor temperature and the desired temperature as three degrees, that are a reference temperature difference, or more, when 30 minutes elapse after the airflow volume was set, the air conditioner 1000 may determine that the unsatisfactory situation has occurred with respect to the cool air-conditioning sensation.

Referring to a third time period 425, in response to determining that the unsatisfactory situation has occurred with respect to the cool air-conditioning sensation, the air conditioner 1000 may increase the frequency of the compressor 1200 to a second critical frequency while maintaining the airflow volume as the set airflow volume. By increasing the frequency of the compressor 1200 to the second critical frequency, colder airflow is discharged, and thus, the indoor temperature may quickly decrease.

Referring to a fourth time period 427, when the indoor temperature reaches the desired temperature, the air conditioner 1000 may decrease the frequency of the compressor 1200 from the second critical frequency back to the first critical frequency so that the compressor 1200 operates in a frequency period in which the reliability of the compressor 1200 is guaranteed.

Figure 5:
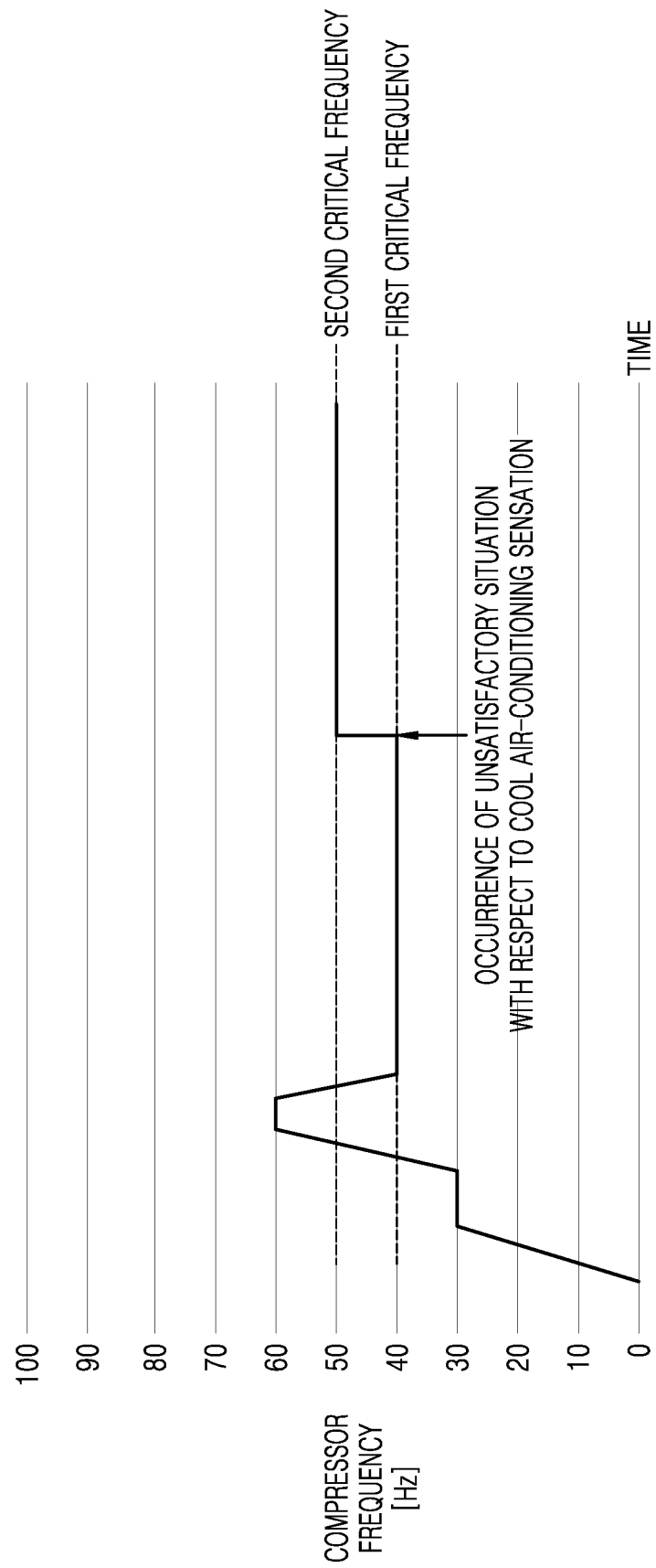
FIG. 5 illustrates a method, performed by an air conditioner, of determining whether an unsatisfactory situation has occurred with respect to a cool air-conditioning sensation, according to an embodiment of the disclosure.

FIG. 5 illustrates a method, performed by an air conditioner, of determining whether an unsatisfactory situation has occurred with respect to a cool air-conditioning sensation, according to an embodiment of the disclosure.

Referring to FIG. 5, the air conditioner 1000 may determine whether the unsatisfactory situation has occurred with respect to the cool air-conditioning sensation, based on at least one cool air-conditioning sensation measurement item.

The at least one cool air-conditioning sensation measurement item may include an indoor temperature item, an indoor humidity item, an indoor temperature and desired temperature difference item, a per-unit time indoor temperature variation item, and a set airflow volume operating duration item but is not limited thereto.

Unsatisfaction conditions with respect to a cool air-conditioning sensation respectively corresponding to the cool air-conditioning sensation measurement items may be stored in the air conditioner 1000. For example, a cool air-conditioning sensation unsatisfaction condition corresponding to the indoor temperature item may be a condition in which an indoor temperature is 27 degrees or more. In addition, a cool air-conditioning sensation unsatisfaction condition corresponding to the indoor temperature and desired temperature difference item may be a condition in which a difference between the indoor temperature and a desired temperature is three degrees or more. In addition, a cool air-conditioning sensation unsatisfaction condition corresponding to the per-unit time indoor temperature variation item may be a condition in which a variation of the indoor temperature per unit time is 0.1 degrees or less per minute. In addition, a cool air-conditioning sensation unsatisfaction condition corresponding to the set airflow volume operating duration item may be a condition in which 30 minutes elapse after operating in a set airflow volume.

The air conditioner 1000 according to an embodiment of the disclosure may determine that the unsatisfactory situation has occurred with respect to the cool air-conditioning sensation when the set airflow volume operating duration item satisfies the corresponding cool air-conditioning sensation unsatisfaction condition, and when one of the items except for the set airflow volume operating duration item satisfies a corresponding cool air-conditioning sensation unsatisfaction condition. For example, when 30 minutes elapse after operating in the set airflow volume, and when the difference between the indoor temperature and the desired temperature is three degrees or more, the air conditioner 1000 may determine that the unsatisfactory situation has occurred with respect to the cool air-conditioning sensation.

In addition, the air conditioner 1000 according to another embodiment of the disclosure may determine that the unsatisfactory situation has occurred with respect to the cool air-conditioning sensation when a plurality of cool air-conditioning sensation measurement items satisfy all respective cool air-conditioning sensation unsatisfaction conditions. For example, the air conditioner 1000 may determine that the unsatisfactory situation has occurred with respect to the cool air-conditioning sensation only when all of the indoor temperature item, the indoor humidity item, the indoor temperature and desired temperature difference item, the per-unit time indoor temperature variation item, and the set airflow volume operating duration item satisfy the respective cool air-conditioning sensation unsatisfaction conditions.

Figure 6:
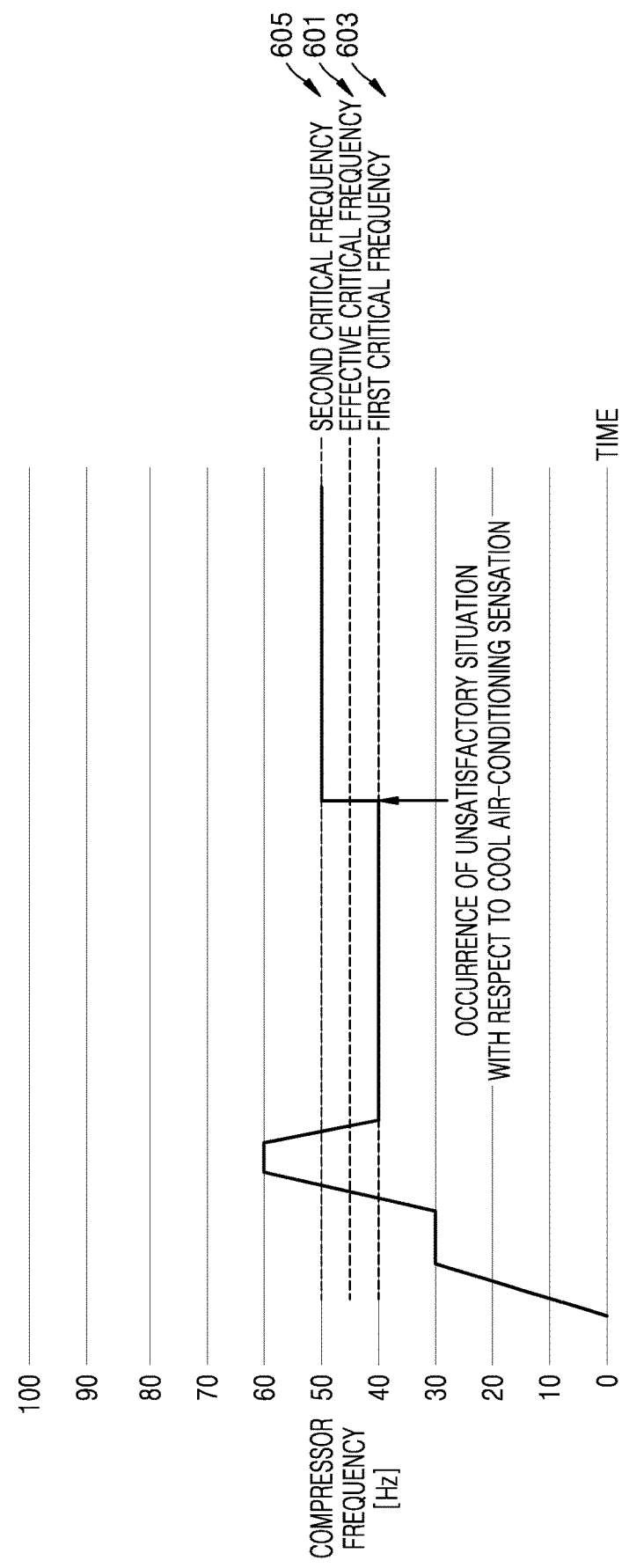
FIG. 6 illustrates a method, performed by an air conditioner, of increasing a frequency of a compressor to a second critical frequency, according to an embodiment of the disclosure.

FIG. 6 illustrates a method, performed by an air conditioner, of increasing a frequency of a compressor to a second critical frequency, according to an embodiment of the disclosure.

Referring to FIG. 6, in response to determining that an unsatisfactory situation has occurred with respect to a cool air-conditioning sensation, the air conditioner 1000 may increase the frequency of the compressor 1200 from a first critical frequency 603 to a second critical frequency 605.

The first critical frequency 603 may be a frequency less than or equal to an effective critical frequency 601 that is a maximum frequency in a frequency period in which the reliability of the compressor 1200 is guaranteed in a set airflow volume The air conditioner 1000 may provide an air-conditioning capacity in a range in which the reliability of the compressor 1200 is guaranteed, while maintaining the frequency of the compressor 1200 as the first critical frequency 603 or less.

The second critical frequency 605 may be greater than the effective critical frequency 601. For example, the air conditioner 1000 may be set so that a difference between the second critical frequency 605 and the effective critical frequency 601 is 10% of the effective critical frequency 601, but is not limited thereto.

In addition, according to an embodiment of the disclosure, there may be a plurality of second critical frequencies. For example, a (2-1)st critical frequency may be 45 Hz, and a (2-2)nd critical frequency may be 50 Hz. The air conditioner 1000 may select the (2-1)st or (2-2)nd critical frequency based on a cool air-conditioning sensation measurement item. For example, as a difference between an indoor temperature and a desired temperature is larger, a higher second critical frequency may be selected.

The air conditioner 1000 may discharge colder airflow by increasing the frequency of the compressor 1200 from the first critical frequency 603 to the selected second critical frequency.

Figure 7:
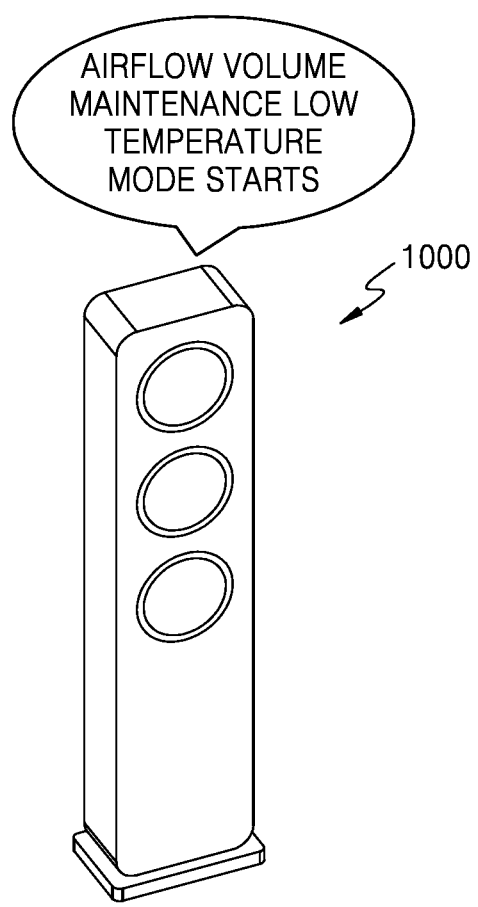
FIG. 7 illustrates a method, performed by an air conditioner, of providing an alarm indicating that an airflow temperature is decreased, according to an embodiment of the disclosure.

FIG. 7 illustrates a method, performed by an air conditioner, of providing an alarm indicating that a temperature of airflow is decreased, according to an embodiment of the disclosure.

Referring to FIG. 7, in response to determining that an unsatisfactory situation has occurred with respect to a cool air-conditioning sensation, the air conditioner 1000 may provide an alarm for notifying that the temperature of airflow is decreased while maintaining an airflow volume as a set airflow volume.

For example, in response to determining that the unsatisfactory situation has occurred with respect to the cool air-conditioning sensation, the air conditioner 1000 may output an alarm sound "the airflow volume maintenance low temperature mode starts".

In addition, as another example, the air conditioner 1000 may display an icon or a phrase indicating that the temperature of airflow is decreased while maintaining the airflow volume.

In addition, as another example, the air conditioner 1000 may transmit, to an external device, alarm information indicating that the temperature of airflow is decreased while maintaining the airflow volume, so that the external device displays the received alarm information.

Figure 8:
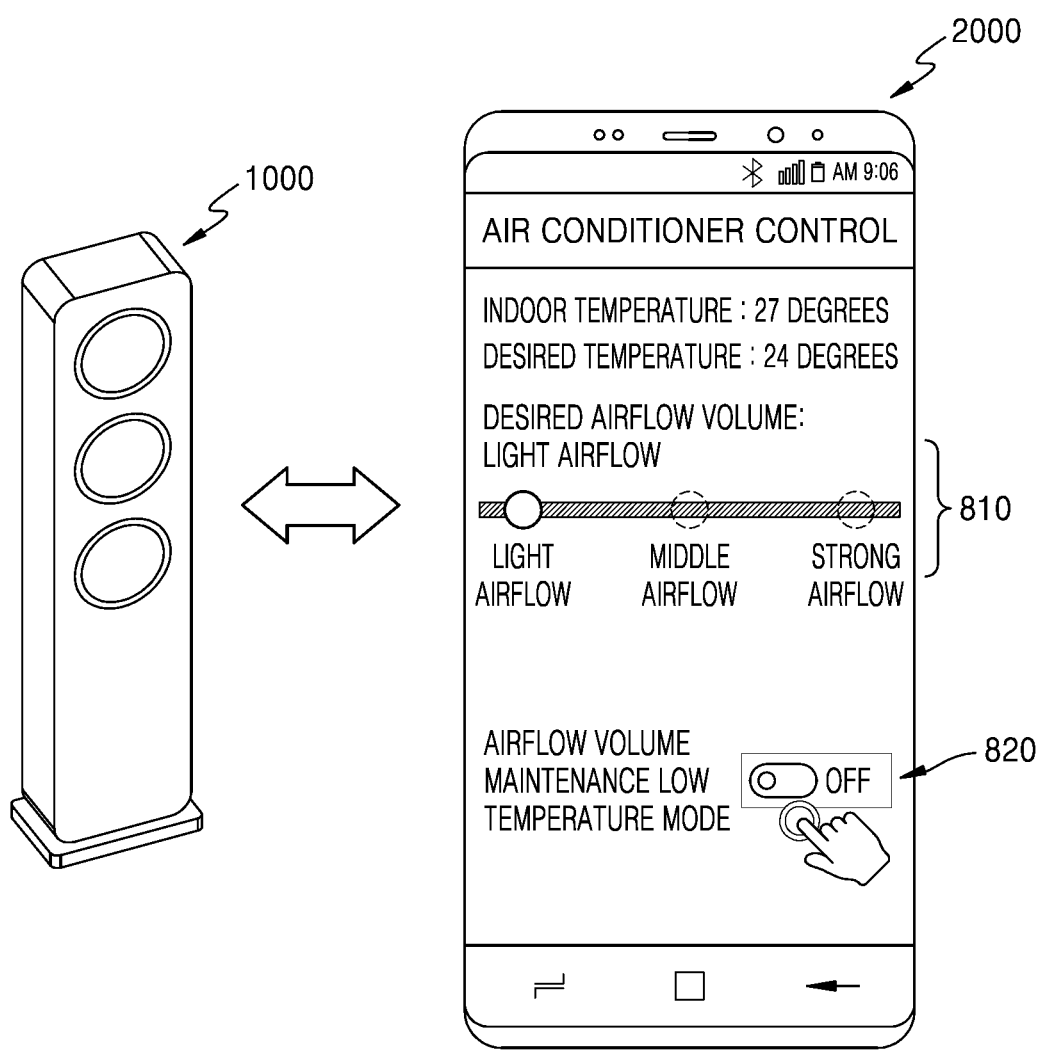
FIG. 8 illustrates a method, performed by an air conditioner, of decreasing an airflow temperature based on a user input, according to an embodiment of the disclosure.

FIG. 8 illustrates a method, performed by an air conditioner, of decreasing a temperature of airflow based on a user input, according to an embodiment of the disclosure.

Referring to FIG. 8, the air conditioner 1000 may decrease only a temperature of airflow while maintaining an airflow volume based on a user input for setting the airflow volume maintenance low temperature mode.

The air conditioner 1000 may receive a user input for setting the airflow volume maintenance low temperature mode, through the user input interface in the air conditioner 1000, and as shown in FIG. 8, the user input for setting the airflow volume maintenance low temperature mode may be received through a smart device 2000 such as a cellular phone.

According to an embodiment of the disclosure, the smart device 2000 may display an airflow volume maintenance low temperature mode setting menu 820 together with an airflow volume setting menu 810.

In addition, according to another embodiment of the disclosure, the smart device 2000 may display the airflow volume maintenance low temperature mode setting menu 820 only when a user input for setting light airflow is received.

In addition, according to another embodiment of the disclosure, the smart device 2000 may display the airflow volume maintenance low temperature mode setting menu 820 when a difference between an indoor temperature and a desired temperature is a critical temperature difference or more.

In addition, according to another embodiment of the disclosure, the smart device 2000 may display the airflow volume maintenance low temperature mode setting menu 820 only for an unsatisfactory situation with respect to a cool air-conditioning sensation. That is, for the unsatisfactory situation with respect to the cool air-conditioning sensation, the airflow volume maintenance low temperature mode setting menu 820 may be provided in order for the user to select whether to execute the airflow volume maintenance low temperature mode instead of automatically increasing the frequency of the compressor 1200 by the air conditioner 1000.

In response to receiving a user input for setting the airflow volume maintenance low temperature mode through the airflow volume maintenance low temperature mode setting menu 820, the smart device 2000 may transmit, to the air conditioner 1000, configuration information indicating that the airflow volume maintenance low temperature mode is set.

In response to receiving the configuration information, the air conditioner 1000 may discharge colder airflow by increasing the frequency of the compressor 1200 to a second critical frequency without changing the airflow volume.

Figure 9:
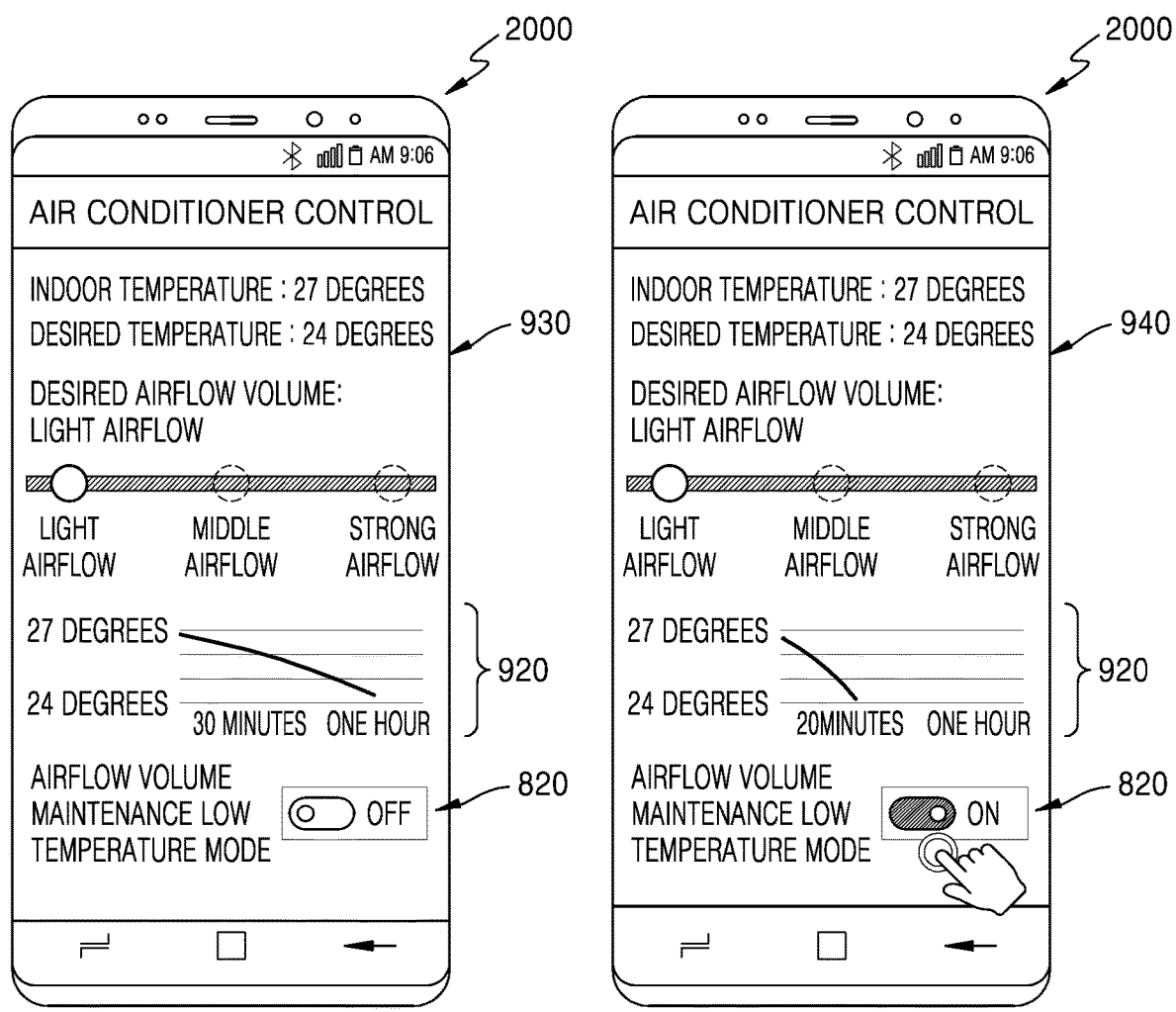
FIG. 9 illustrates a method, performed by an air conditioner, of displaying an estimated indoor temperature over time, according to an embodiment of the disclosure.

FIG. 9 illustrates a method, performed by an air conditioner, of displaying an estimated indoor temperature along time, according to an embodiment of the disclosure.

Referring to FIG. 9, in response to receiving a user input for setting the airflow volume maintenance low temperature mode, the air conditioner 1000 may display an estimated indoor temperature along time when operating in the airflow volume maintenance low temperature mode.

The air conditioner 1000 may display an estimated indoor temperature along time through the display in the air conditioner 1000, and as shown in FIG. 9, the estimated indoor temperature along time may be displayed through the smart device 2000.

The air conditioner 1000 may learn an estimated indoor temperature along time. For example, the air conditioner 1000 may learn an estimated indoor temperature along time through machine learning by setting an airflow volume and a difference between an indoor temperature and a desired temperature as input data and setting an indoor temperature along time as target data.

In response to receiving a user input for setting an airflow volume, the smart device 2000 may display an image 920 indicating a change in the indoor temperature along time, which is estimated in the set airflow volume. In addition, in response to receiving a user input for setting light airflow, the smart device 2000 may display the airflow volume maintenance low temperature mode setting menu 820.

Referring to a user interface 930 in which the airflow volume maintenance low temperature mode is set to off, the smart device 2000 may display information indicating that one hour is taken for the indoor temperature to reach the desired temperature.

Referring to a user interface 940 in which the airflow volume maintenance low temperature mode is set to on, in response to a user input for setting the airflow volume maintenance low temperature mode to on, the smart device 2000 may display information indicating that 20 minutes are taken for the indoor temperature to reach the desired temperature.

By providing information about a change in the indoor temperature along time, which is expected when the airflow volume maintenance low temperature mode is set to on or off, a guide for operating mode selection may be provided to the user.

Figure 10:
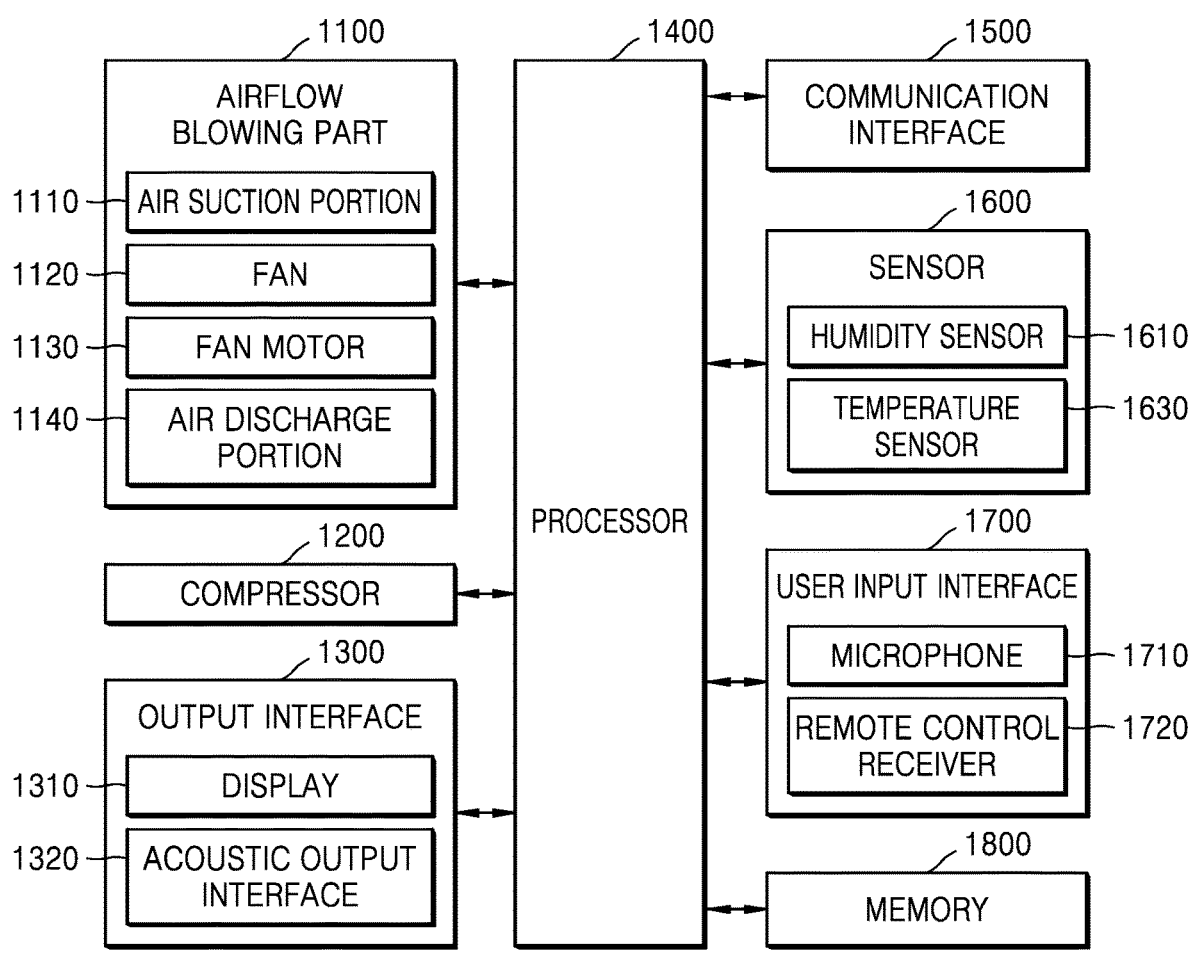
FIG. 10 is a block diagram of an air conditioner according to an embodiment of the disclosure.

FIG. 10 is a block diagram of the air conditioner 1000 according to an embodiment of the disclosure.

Referring to FIG. 10, the air conditioner 1000 may include an air blowing part 1100, the compressor 1200, an output interface 1300, the processor 1400, a communication interface 1500, a sensor 1600, a user input interface 1700, and a memory 1800.

Not all of the shown components are mandatory components of the air conditioner 1000. The air conditioner 1000 may be implemented by more or less components than the components shown in FIG. 10. For example, the air conditioner 1000 may be implemented only by the air blowing part 1100, the compressor 1200, the user input interface 1700, and the processor 1400.

The air blowing part 1100 may include an air suction portion 1110, the fan 1120, a fan motor 1130, and an air discharge portion 1140 but is not limited thereto.

The air suction portion 1110 may suck air around the air conditioner 1000.

The fan 1120 may form a flow of air so that external air is introduced to the inside the air conditioner 1000 through the air suction portion 1110. In addition, the fan 1120 may discharge air cooled by the heat exchanger to the outside of the air conditioner 1000 through the air discharge portion 1140. The fan 1120 may be rotated by the fan motor 1130 to form a flow of air. A rotating speed (i.e., revolutions per minute) of the fan motor 1130 may be adjusted under control by the processor 1400.

The fan 1120 may include a high-pass (whirl) fan and a circulator fan. According to implementation examples, a plurality of high-pass fans and a plurality of circulator fans may be arranged. The high-pass fan may discharge quick and strong cold air. For example, the high-pass fan may discharge strong cold air immediately after sucking air in a high-pass scheme. The circulator fan may perform a function of blowing airflow to a far place. The circulator fan may form a strong jet stream at a side airflow opening (a circular air discharge port) by sucking in airflow.

The air discharge portion 1140 may include blades (not shown). The blades may change an airflow discharge direction to up/down or left/right.

According to an embodiment of the disclosure, the air discharge portion 1140 may include a metal cooling panel and the circular air discharge port, through which cold air is discharged. The metal cooling panel may include micro holes of a sand grain size having a diameter of 1 mm, through which cold air is discharged. Cold air may be uniformly spread through the metal cooling panel including the micro holes.

The compressor 1200 may compress a refrigerant.

The output interface 1300 is to output an audio signal or a video signal. The output interface 1300 may include a display 1310 and an acoustic output interface 1320.

When the display 1310 and a touch pad form a layer structure to configure a touch screen, the display 1310 may be used as not only an output device but also an input device. The display 1310 may include at least one of a liquid crystal display, a thin-film transistor liquid crystal display, an organic light-emitting diode, a flexible display, a three-dimensional (3D) display, or an electrophoretic display. In addition, the air conditioner 1000 may include two or more displays 1310 according to implementation forms of the air conditioner 1000.

According to an embodiment of the disclosure, the display 1310 may display an operating mode of the air conditioner 1000, a current indoor temperature, current indoor humidity, a current airflow velocity (or airflow volume), a desired temperature, and the like but is not limited thereto.

The acoustic output interface 1320 may output audio data received through the communication interface 1500 or stored in the memory 1800. For example, the acoustic output interface 1320 may output an acoustic signal associated with a function (e.g., an alarm sound, a guidance voice, or a guide voice) performed by the air conditioner 1000.

According to an embodiment of the disclosure, the output interface 1300 may include an output interface of a remote control device (a remote control). For example, the operating mode of the air conditioner 1000, the desired temperature, a current airflow velocity, the current indoor temperature, the current indoor humidity, and the like may be displayed through the output interface of the remote control device (the remote control). In addition, the remote control device (the remote control) may output a guidance voice for the user.

According to an embodiment of the disclosure, the output interface 1300 may output information associated with the airflow volume maintenance low temperature mode. For example, the output interface 1300 may output a text, an image (e.g., an icon), or a voice for informing that the airflow volume maintenance low temperature mode starts. In addition, for example, the output interface 1300 may output a text, an image, or a voice for asking whether to start the airflow volume maintenance low temperature mode.

The processor 1400 commonly controls a general operation of the air conditioner 1000. For example, the processor 1400 may commonly control the fan 1100, the compressor 1200, the output interface 1300, the communication interface 1500, the sensor 1600, the user input interface 1700, the memory 1800, a power supply (not shown), and the like by executing programs stored in the memory 1800.

According to an embodiment of the disclosure, the processor 1400 may include a plurality of processors. In addition, the processor 1400 may include an artificial intelligent (AI) processor configured to generate a learning network model but is not limited thereto.

According to an embodiment of the disclosure, the processor 1400 may determine whether an unsatisfactory situation has occurred with respect to a cool air-conditioning sensation, by executing one or more instructions stored in the memory 1800.

The communication interface 1500 may include one or more components for communicating between the air conditioner 1000 and a server (not shown), a smart device (not shown), or an external sensor device (not shown). For example, the communication interface 1500 may include a short-range wireless communication interface and the like but is not limited thereto.

The short-range wireless communication interface may include a Bluetooth communication interface, a Bluetooth low energy (BLE) communication interface, a near-field communication interface, a wireless local area network (WLAN) (Wi-Fi) communication interface, a Zigbee communication interface, an infrared data association (IrDA) communication interface, a Wi-Fi Direct (WFD) communication interface, an ultra-wideband (UWB) communication interface, an Ant+ communication interface, and the like but is not limited thereto.

The sensor 1600 may include a humidity sensor 1610, a temperature sensor 1630, and the like but is not limited thereto. The humidity sensor 1610 may measure humidity in the air. The temperature sensor 1630 may measure a temperature of the air. A function of each sensor could be intuitively inferred by those of ordinary skill in the art from the name thereof, and thus, a detailed description thereof is omitted herein.

The user input interface 1700 may indicate a means through which the user inputs data for controlling the air conditioner 1000. For example, the user input interface 1700 may include a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

According to an embodiment of the disclosure, the user input interface 1700 may include a power button, an operating mode button (e.g., the airflow volume maintenance low temperature mode, a comfortable mode, an air-conditioning mode, a dehumidification mode, and a tidiness mode), a no-airflow function button, a desired temperature setting button, a reservation setting button, a volume adjustment button, a sleeping button, an automatic sterilization button, and the like but is not limited thereto.

The user input interface 1700 may further include a microphone 1710 configured to receive the user's voice input. The microphone 1710 receives an external acoustic signal and processes the external acoustic signal to electrical voice data. For example, the microphone 1710 may receive an acoustic signal (e.g., a voice command) from an external device or a speaker. The microphone 1710 may use various noise cancellation algorithms to cancel noise generated in a process of receiving an external acoustic signal.

According to an embodiment of the disclosure, the user input interface 1700 may include a remote control device (a remote control) and a remote control receiver 1720. The remote control device (the remote control) may include a power button, a voice recognition button, an operating mode button, a tidiness function button, a voice recognition microphone, a no-airflow function button, a MAX button, a shift and adjustment button, a temperature and airflow volume adjustment button, an additional function selection button, and the like but is not limited thereto. According to an embodiment of the disclosure, when the user utters a voice command while pushing the voice recognition button of the remote control device (the remote control), the remote control device may identify the voice command of the user.

The processor 1400 may receive, through the user input interface 1700, a user input for setting an airflow volume of airflow to be discharged.

The remote control receiver 1720 may receive a control signal from the remote control device. For example, the remote control receiver 1720 may receive the control signal input by the user, from the remote control device through IR communication.

The memory 1800 may store programs for processing and control by the processor 1400 and store input/output data (e.g., operating mode information, user setting information, temperature data, humidity data, alarm setting, device information, airflow velocity information, and the like).

The memory 1800 may include at least one type of storage medium among a flash memory type memory, a hard disk type memory, a multimedia card micro type memory, a card type memory (e.g., a secure digital (SD) or extreme digital (XD) memory), random access memory (RAM), static RAM (SRAM), read only memory (ROM), electrically erasable programmable ROM (EEPROM), PROM, a magnetic memory, a magnetic disc, and an optical disc. The programs stored in the memory 1800 may be classified into a plurality of modules according to functions thereof. At least one AI model may be stored in the memory 1800.

The air conditioner 1000 may further include a power supply (not shown). The power supply (not shown) may supply power to the components of the air conditioner 1000 under control by the processor 1400. The power supply (not shown) may supply power input from an external power source through a power cord to each of the components of the air conditioner 1000 under control by the processor 1400.

Some embodiments of the disclosure may be implemented in a form of a recording medium including computer-executable instructions such as a program module executed by a computer system. A non-transitory computer-readable medium may be an arbitrary available medium which may be accessed by a computer system and includes all types of volatile and nonvolatile media and separated and non-separated media. In addition, the non-transitory computer-readable medium may include all types of computer storage media and communication media. The computer storage media include all types of volatile and nonvolatile and separated and non-separated media implemented by an arbitrary method or technique for storing information such as computer-readable instructions, a data structure, a program module, or other data. In addition, some embodiments of the disclosure may also be implemented by a computer program or a computer program product including computer-executable instructions such as a computer program executed by a computer system.

What is claimed is:

1. An air conditioner comprising:
a compressor configured to compress a refrigerant;
a fan configured to discharge air cooled by the refrigerant; and
at least one processor configured to
receive a user input for setting an airflow volume of the air to be discharged and a desired temperature,
determine a temperature difference between an indoor temperature and the received desired temperature,
determine whether the temperature difference exceeds a critical temperature difference,
increase a frequency of the compressor to a first critical frequency and maintain the frequency of the compressor as the first critical frequency in response to determining that the temperature difference between the indoor temperature and the desired temperature exceeds the critical temperature difference while controlling the fan to discharge the air with the set airflow volume,
determine whether an unsatisfactory condition has occurred based on at least one cool air-conditioning sensation measurement item while maintaining the frequency of the compressor as the first critical frequency, and
increase the frequency of the compressor to a second critical frequency from the first critical frequency to further decrease a current temperature of the air to be discharged in response to determining that the unsatisfactory condition has occurred.

2. The air conditioner of claim 1, wherein the first critical frequency is less than or equal to an effective critical frequency that is a maximum frequency in a frequency period in which an air-conditioning capacity of the compressor is proportional to the frequency of the compressor in the set airflow volume, and the second critical frequency is greater than the effective critical frequency.

3. The air conditioner of claim 1, wherein the at least one processor is further configured to increase the frequency of the compressor to the second critical frequency only when the set airflow volume is set as light airflow.

4. The air conditioner of claim 1, wherein the at least one cool air-conditioning sensation measurement item comprises the temperature difference between the indoor temperature and the desired temperature and a set airflow volume duration, and the unsatisfactory condition is occurred when the temperature difference between the indoor temperature and the desired temperature is greater than or equal to a reference temperature difference and the set airflow volume duration is greater than or equal to a reference time.

5. The air conditioner of claim 1, wherein the at least one processor is further configured to provide an alarm for notifying that a temperature of the air is further decreased while maintaining the airflow volume of airflow as the set airflow volume, in response to the occurrence of the unsatisfactory condition.

6. The air conditioner of claim 1, wherein the at least one processor is further configured to determine whether indoor humidity is less than or equal to a reference humidity, in response to the occurrence of the unsatisfactory condition, and increase the frequency of the compressor to the second critical frequency only when the indoor humidity is less than or equal to the reference humidity.

7. The air conditioner of claim 1, wherein the at least one processor is further configured to decrease the frequency of the compressor back to the frequency that is less than or equal to the first critical frequency when the indoor temperature reaches the desired temperature while maintaining the frequency of the compressor as the second critical frequency.

8. The air conditioner of claim 1, wherein the at least one processor is further configured to decrease the frequency of the compressor back to the frequency that is less than or equal to the first critical frequency when a critical time elapses from a time point where the frequency of the compressor was changed to the second critical frequency while maintaining the frequency of the compressor as the second critical frequency.

9. The air conditioner of claim 1, wherein the at least one processor is further configured to receive a user input for setting an airflow volume maintenance low temperature mode that is a mode of decreasing only a temperature of the air to be discharged while maintaining the airflow volume of the air, and increase the frequency of the compressor to the second critical frequency while maintaining the airflow volume of the air as the set airflow volume in response to receiving the user input for setting the airflow volume maintenance low temperature mode.

10. The air conditioner of claim 9, wherein the at least one processor is further configured to display a time-based indoor temperature expected when operating in the airflow volume maintenance low temperature mode, in response to receiving the user input for setting the airflow volume maintenance low temperature mode.

11. A method of controlling an air conditioner, the method comprising:
receiving a user input for setting an airflow volume and a desired temperature;
determining a temperature difference between an indoor temperature and the received desired temperature;
determining whether the temperature difference exceeds a critical temperature difference;
increasing a frequency of a compressor to a first critical frequency and maintaining the frequency of the compressor as the first critical frequency in response to the determining that the temperature difference between the indoor temperature and the desired temperature exceeds the critical temperature difference while discharging the air with the set airflow volume;
determining whether an unsatisfactory condition has occurred based on at least one cool air-conditioning sensation measurement item while maintaining the frequency of the compressor as the first critical frequency; and
increasing the frequency of the compressor to a second critical frequency from the first critical frequency to further decrease a current temperature of the air to be discharged in response to the determining that the unsatisfactory condition has occurred.

12. The method of claim 11, wherein the first critical frequency is less than or equal to an effective critical frequency that is a maximum frequency in a frequency period in which an air-conditioning capacity of the compressor is proportional to the frequency of the compressor in the set airflow volume, and the second critical frequency is greater than the effective critical frequency.

13. The method of claim 11, wherein the increasing of the frequency of the compressor to the second critical frequency comprises increasing the frequency of the compressor to the second critical frequency only when the set airflow volume is set as light airflow.

14. The method of claim 11, wherein the at least one cool air-conditioning sensation measurement item comprises the temperature difference between the indoor temperature and the desired temperature and a set airflow volume duration, and the unsatisfactory condition is occurred when the temperature difference between the indoor temperature and the desired temperature is greater than or equal to a reference temperature difference and the set airflow volume duration is greater than or equal to a reference time.

15. The method of claim 11, further comprising providing an alarm for notifying that a temperature of airflow is further decreased while maintaining the airflow volume of the air as the set airflow volume, in response to the occurrence of the unsatisfactory condition with respect to the cool air-conditioning sensation.

16. The method of claim 11, wherein the increasing of the frequency of the compressor to the second critical frequency comprises:
determining whether indoor humidity is less than or equal to a reference humidity, in response to the occurrence of the unsatisfactory condition; and
increasing the frequency of the compressor to the second critical frequency only when the indoor humidity is less than or equal to the reference humidity.

17. The method of claim 11, further comprising decreasing the frequency of the compressor back to the frequency that is less than or equal to the first critical frequency when the indoor temperature reaches the desired temperature while maintaining the frequency of the compressor as the second critical frequency.

18. The method of claim 11, further comprising decreasing the frequency of the compressor back to the frequency that is less than or equal to the first critical frequency when a critical time elapses from a time point where the frequency of the compressor was changed to the second critical frequency while maintaining the frequency of the compressor as the second critical frequency.

19. The method of claim 11, further comprising:
receiving a user input for setting a airflow volume maintenance low temperature mode that is a mode of decreasing only a temperature of the air to be discharged while maintaining the airflow volume of the air; and
increasing the frequency of the compressor to the second critical frequency while maintaining the airflow volume of the air as the set airflow volume in response to receiving the user input for setting the airflow volume maintenance low temperature mode.

20. The method of claim 19, further comprising displaying a time-based indoor temperature expected when operating in the airflow volume maintenance low temperature mode, in response to receiving the user input for setting the airflow volume maintenance low temperature mode.

* * * * *